United States Patent
Soliman

(10) Patent No.: US 7,729,698 B2
(45) Date of Patent: Jun. 1, 2010

(54) COMMUNICATION SYSTEM RECEIVER AND METHOD FOR CONCURRENT RECEIVING OF MULTIPLE CHANNELS

(75) Inventor: Samir S. Soliman, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 717 days.

(21) Appl. No.: 09/965,341

(22) Filed: Sep. 27, 2001

(65) Prior Publication Data

US 2003/0060230 A1     Mar. 27, 2003

(51) Int. Cl.
*H04W 36/00* (2009.01)
(52) U.S. Cl. .................. 455/436; 455/440; 455/437; 455/525; 370/331
(58) Field of Classification Search ............ 455/436, 455/440, 437, 525; 370/331
See application file for complete search history.

(56) References Cited

U.S. PATENT DOCUMENTS

| | | | |
|---|---|---|---|
| 3,718,767 A * | 2/1973 | Ellis | 370/496 |
| 4,282,401 A | 8/1981 | Takahashi | |
| 5,357,544 A * | 10/1994 | Horner et al. | 375/340 |
| 5,485,517 A | 1/1996 | Gray | |
| 5,799,005 A * | 8/1998 | Soliman | 370/335 |
| 5,854,785 A | 12/1998 | Willey | 370/332 |
| 5,898,774 A | 4/1999 | Shindo | |
| 6,009,129 A * | 12/1999 | Kenney et al. | 375/346 |
| 6,011,785 A | 1/2000 | Carney et al. | 370/330 |
| 6,073,033 A | 6/2000 | Campo | |
| 6,240,302 B1 | 5/2001 | Harrison | |
| 6,321,090 B1 * | 11/2001 | Soliman | 455/440 |
| 6,549,789 B1 | 4/2003 | Kfoury | |
| 6,633,759 B1 | 10/2003 | Kobayashi | |
| 6,865,376 B2 | 3/2005 | Forrester | |

FOREIGN PATENT DOCUMENTS

| | | |
|---|---|---|
| CN | 1242131 | 1/2000 |
| JP | 10-165013 | 6/1998 |
| JP | 10-178672 | 6/1998 |

(Continued)

OTHER PUBLICATIONS

Salkintzis, et al: "ADC and DSP Challenges in the Development of Software Radio Base Stations" IEEE Personal Communications, vol. 6(4): 47-55, August 1999.

(Continued)

*Primary Examiner*—Yuwen Pan
(74) *Attorney, Agent, or Firm*—S. Hossain Beladi; Jeffrey D. Jacobs

(57) ABSTRACT

A method and apparatus in a communication system provide for concurrent processings of signals at the different frequencies. A received signal is down converted in a RF/IF system to produce on-channel and out-of-channel received samples. The on-channel received samples are processed in a back-end portion to decode on-channel information. The out-of-channel received samples are processed to determine at least one of a link quality and global positioning system originated information in the back-end portion. The processings of the on-channel received samples and the out-of-channel received samples are performed essentially at the same time by the receiver back-end.

16 Claims, 3 Drawing Sheets

FOREIGN PATENT DOCUMENTS

| | | |
|---|---|---|
| JP | 2000-092550 | 3/2000 |
| JP | 2001-112041 | 4/2001 |
| WO | 9819491 | 5/1998 |
| WO | 0051376 | 8/2000 |
| WO | 0159938 | 8/2001 |

OTHER PUBLICATIONS

Brown, R. et al.: "Embedded Passive Functions for RF and Mixed-Signal Circuits," IEEE, New York, New York, Proceedings 1997 International Conference on Multichip Modules, pp. 351-356.

Deck, D. et al.: "Use of 115 kb/s Infra-Red Interface for Mobile Multimedia." Hewlett-Packard Laboratories, Bristol, U.K, IOS Press, Amsterdam. pp. 980-985 (1994).

Harvey, F.: "The Internet in Your Hands," Scientific American, 283 (4) pp. 40-45 (Oct. 2000).

Ketola, P. et al.: "Coping with Consistency Under Multiple Design Constraints: The Case of Nokia 9000 WWW Browser," London, U.K., Personal Technologies Journal, vol. 4, No. 2, pp. 86-95 (2000).

Kruger, P.: "Growing Pains [GSM and Internet Technologies]," Communications International, U.K., vol. 24, No. 5, pp. 49-50, 52 (May 1997).

O'Malley, C.: "Simonizing the PDA." BYTE: The Magazine of Technology Integration, vol. 19, No. 12, pp. 145-146, 148 (Dec. 1994).

Thompson, T.: "Apple's Improved MessagePad," BYTE: The Magazine of Technology Integration, vol. 20, No. 5, p. 131 (May 1995).

TIA/EIA Interim Standard: "cdma 2000 High Rate Packet Data Air Interface Specification" TIA/EIA/IS-856 (Nov. 2000).

International Preliminary Examination Report, PCT/US2002/030386—International Preliminary Examining Authority—US, Jan. 7, 2004.

* cited by examiner

COMMUNICATION SYSTEM RECEIVER AND METHOD FOR CONCURRENT RECEIVING OF MULTIPLE CHANNELS

FIELD

The present invention relates generally to the field of communications, and more particularly, to communications in a cellular communication system.

BACKGROUND

A communication system may provide communication services that include wireless radio transmission of digitized speech, still or moving images, text messages, position location determination and other types of data. Such communication services may be provided to a type of devices that are mobile, such as a cellular phone, a portable computer, etc. A communication system through a collection of commonly known cell sites provide the communication services without interruption over a broad range of areas to a mobile station. Each cell site may include a base transceiver station and control units. One cell site may have more than one base transceiver stations. Each base transceiver station provides the radio frequency link over a limited geographical area. When a mobile station moves from a location to another, the mobile station may go through a handoff process that allows providing the communication services without interruption. The handoff may be accomplished through a soft hand off or a hard handoff or both. In soft handoff, the mobile station receives essentially identical traffic channel data from at least two base transceiver stations over a common carrier frequency. The base transceiver stations involved in the soft handoff process may be located in two different cell sites or the same cell site. In hard handoff, the resources in a current base station transceiver are released while new communication resources in a new base station are allocated to the user. In hard handoff, the carrier frequency of the current base station may be different than the carrier frequency of the new base station. As such, generally, hard handoff occurs between cell sites that are operating over two different frequencies. Inter-frequency hard handoff can also take place between two frequency assignments in the same cell or same sector.

The process for the hard handoff may be preceded by a search for possible hard handoff candidates including pilot signals belonging to the candidate frequencies. The search may be performed by the mobile station at any time including the time when the mobile station is moving from one cell site to another. The mobile station may need to search for possible hard handoff candidates while maintaining a traffic call with a base station. The receiver portion of the mobile station may need to be tuned to different frequencies for finding a new hard handoff candidate. The mobile station may have only one receiver portion. Therefore, during the search time, the traffic of data on the traffic channel between the current base station and the mobile station may be disrupted or the mobile station may mute the incoming voice information. As such, there may be a substantial delay in delivery of data or suspension of voice traffic data during the search period. Similarly, a single receiver is not capable to maintain two-way communications and global positioning system (GPS) reception for position location determination. The GPS system operates on an independent frequency band.

To this end as well as others, there is a need for a receiver and a method for providing un-interrupted communication services in a communication system.

SUMMARY OF A PREFERRED EMBODIMENT

A method and apparatus in a communication system provide for concurrent processings of signals at the different frequencies. A received signal is down converted in a RF/IF system to produce on-channel and out-of-channel received samples. The on-channel received samples are processed in a back-end portion to decode on-channel information. The out-of-channel received samples are processed to determine at least one of a link quality and global positioning system originated information in the back-end portion. The processings of the on-channel received samples and the out-of-channel received samples are performed essentially at the same time by the receiver back-end.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, a novel and improved receiver and a method provide for efficient processing of received signals in a CDMA communication system. The efficient processing allows providing the communication services to a mobile user without interruption when the mobile station is searching for the hard handoff frequency candidates. Hard handoff between two cell sites or two sectors may be necessary for mobility management. In addition, the hard handoff within one sector or one omni-sector cell may be for resource management. One carrier frequency may be over-utilized by a number of mobile users while the other frequency is under-utilized. For mobility management and in order to maintain a system balance, the base station in communication with the mobile station may request a periodic search of the other frequencies. Under any condition, the mobile station may perform the search without suspending the communication of traffic of data in an ongoing communication call in accordance with various embodiments of the invention.

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
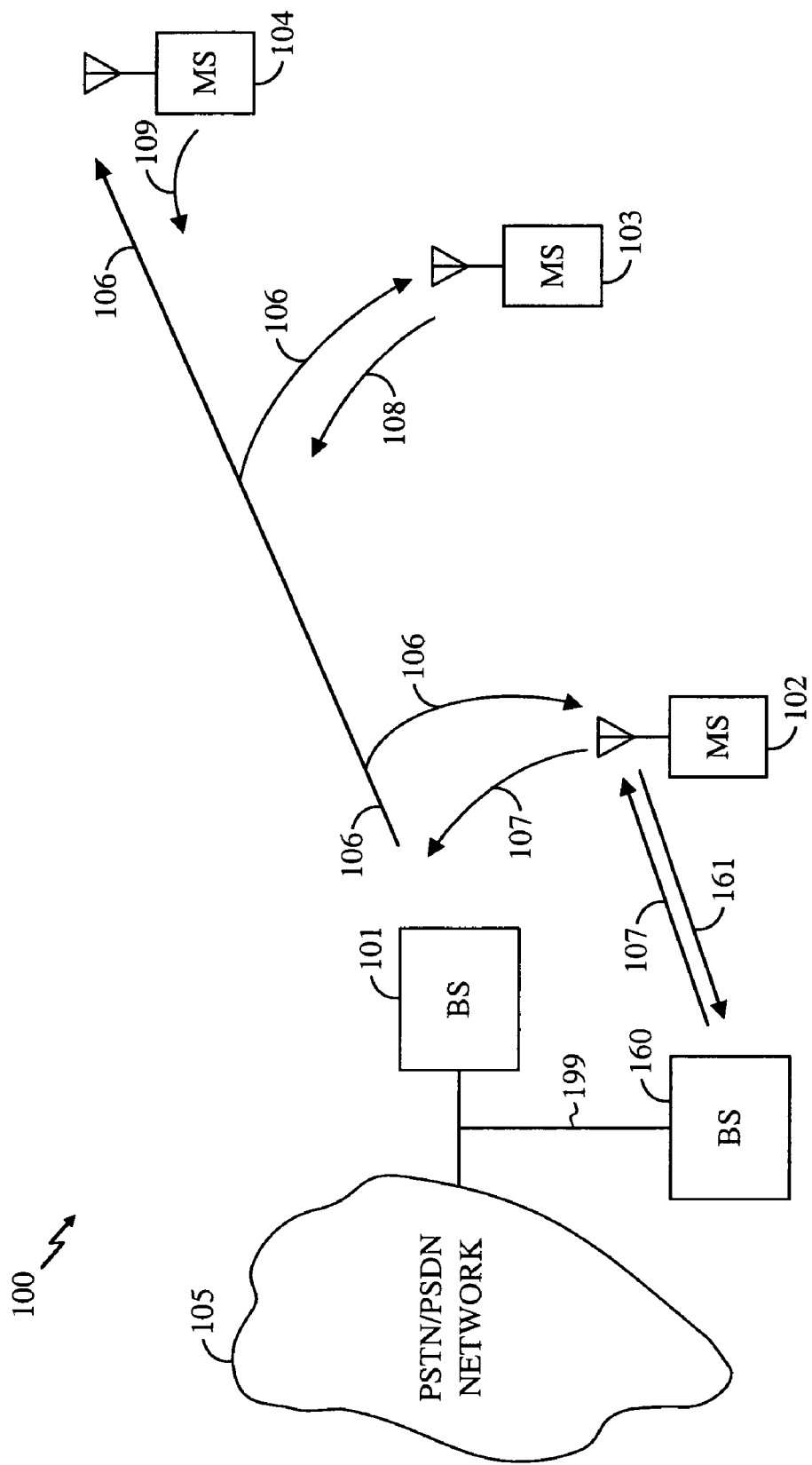
FIG. 1 illustrates a communication system capable of incorporating various embodiments of the invention.

FIG. 1 illustrates a block diagram of a communication system 100 incorporating various embodiments of the invention while operating in compliance with any of the code division multiple access (CDMA) communication system standards. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals and the base station as data access network without departing from the main scope and various advantages of the invention. Base station 101 may include a number of components, such as a base station controller and a base transceiver system. For simplicity, such components are not shown. A mobile switching center (not shown) may control various operating aspects of the communication system 100 and in relation to a back-haul 199 between network 105 and base station 101. A base station 160 may also be connected to the back-haul 199 for providing communication services in another coverage area.

Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for respectively mobile stations 102-104. Base station 101 and base station 160 may be operating over two different frequencies.

To complete a hard handoff process, a candidate base station operating on a different carrier frequency needs to be identified. The selection may be based on several factors including a link quality with the new base station. In order to determine a link quality, the mobile station 102 tunes its receiver to the frequency of the possible base station candidates and measures the link quality. The selection of candidate may be based on the level of the link quality. In accordance with various aspects of the invention, a receiver may tune to one frequency, such as the on-channel frequency, and produce on-channel and out-of-channel signals to find possible pilot candidates for the hard handoff process. The link quality measurements may include the received signal strength, received signal-to-noise ratio or other parameters. In a hard handoff situation from base station 101 to base station 160, the link quality measurement is reported to the base station 101. If the base station 160 is selected as the hard handoff candidate, the base station 160 through a back-haul connection is notified to allow the mobile station 102 to establish a new traffic channel on the new frequency when the hard handoff takes place. The base stations 101 and 160 may also transmit a pilot channel on the forward link to assist the mobile stations in decoding various channels on the forward link and make link quality measurements. The link quality measurements may be based on the quality of the pilot channel signal received at the mobile station.

Figure 2:
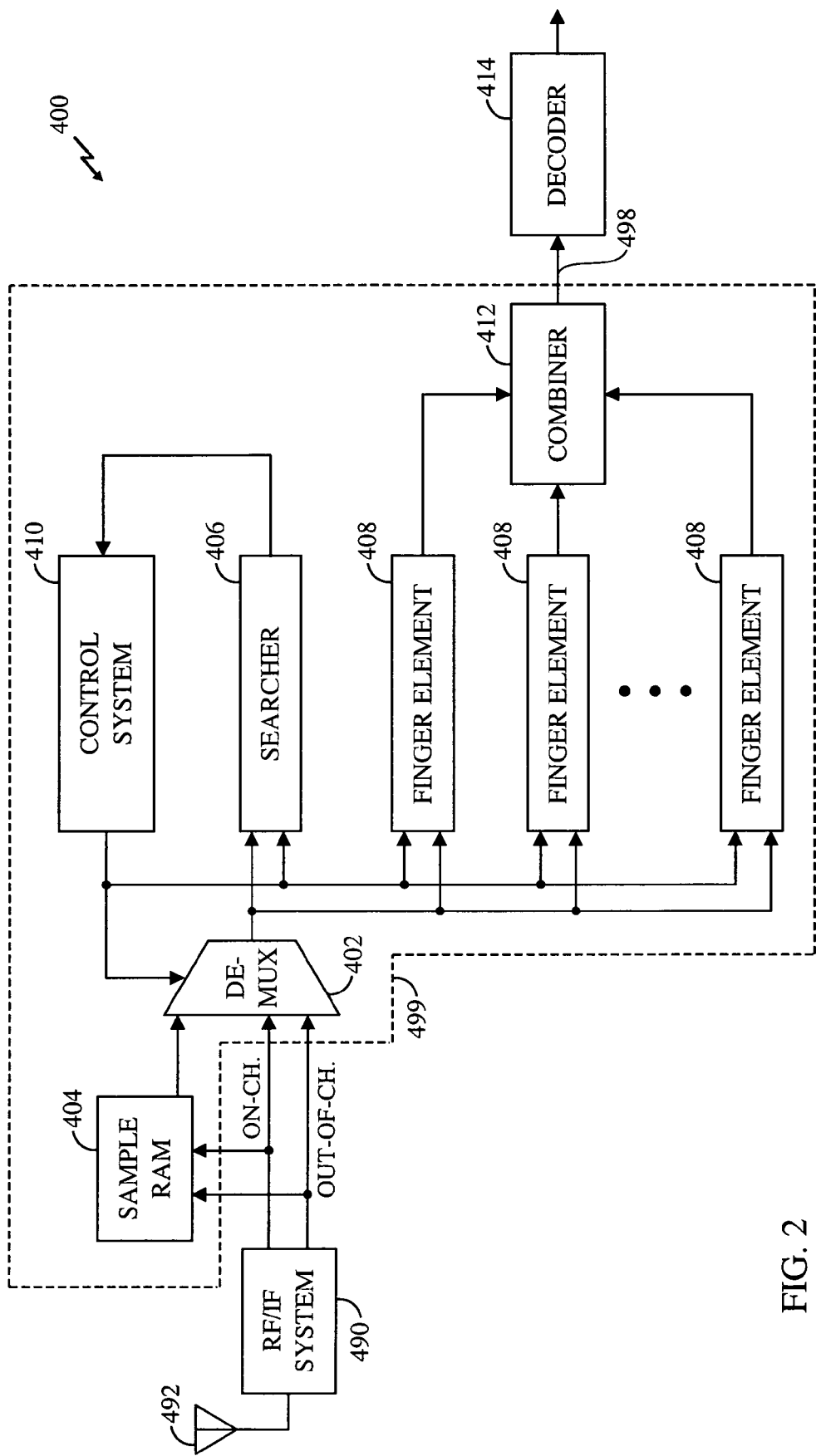
FIG. 2 illustrates a communication system receiver for receiving and decoding received data in accordance with various aspects of the invention.

FIG. 2 illustrates a block diagram of a receiver 400 used for processing and demodulating the received CDMA signal in accordance with various embodiments of the invention. Received (Rx) samples may be stored in RAM 404. Received samples are generated by a radio frequency/intermediate frequency (RF/IF) system 490 and an antenna system 492. Antenna system 492 receives an RF signal, and passes the RF signal to RF/IF system 490. The received RF signals are filtered, down-converted and digitized to form RX samples at base band frequencies. The samples are provided to a back-end processing block 499. In the back-end processing block 499, the samples are supplied to a demultiplexer (demux) 402. The RF/IF system 490 may produce at least two sets of received samples in accordance with various embodiments of the invention. One set for the on-channel communications, and another set for out-of-channel communications. The on-channel communications include the traffic channel between the base station and the mobile station. The out-of-channel samples are digitally filtered and are used to search for the hard handoff candidate frequencies. The out-of-channel received samples may also include information about the GPS received signals for determining the mobile station position. The on-channel and out-of-channel samples are produced essentially at the same time in accordance with various embodiments of the invention.

The on-channel and out-of-channel samples may be stored in RAM 404 and supplied to demux 402. The output of demux 402 is supplied to a searcher unit 406 and finger elements 408. A control unit 410 is coupled thereto. A combiner 412 couples a decoder 414 to finger elements 408. Control unit 410 may be a microprocessor controlled by software, and may be located on the same integrated circuit or on a separate integrated circuit. The decoding function in decoder 414 may be in accordance with a Viterbi algorithm or a turbo decoder.

In an embodiment, both the On-channel and out-of-channel signals are processed in parallel and in real time. During operation, the received on-channel and out-of channel samples are supplied to demux 402. Demux 402 supplies the on-channel and out-of-channel samples to searcher unit 406 and finger elements 408. Control unit 410 configures finger elements 408 to perform demodulation of the received on-channel samples at different time offsets based on search results from searcher unit 406. The results of the demodulation are combined and passed to decoder 414. Decoder 414 decodes the data and outputs the on-channel decoded data.

Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. For the on-channel samples, the PN sequence of the base station currently in a traffic communication with the mobile station is used. For processing the out-of-channel samples to determine a link quality, similar back-end operations are performed over the out-of channel received samples. The PN sequence of a candidate base station, however, is used in the back-end processing of the out-of-channel received samples. Base station 101 may be the base station having a traffic channel communication with the mobile station, and the base station 160 may be a hard handoff candidate base station.

Base station 101 may provide coverage in one cell site over one carrier frequency and base station 160 in another cell over another carrier frequency. One ordinary skilled in the art may appreciate that the term "cell site" is a general term used to describe a collection of hardware and related software embedded therein for providing communication services over a limited geographical area. A cell site may be divided into two or more sectors, where each sector may have a collection of hardware and related software embedded therein for providing communication services over a limited geographical area. Two or more sectors may make up a cell site. Therefore, the terms cell site and sector used herein may be interchangeable without departing from the advantages of the invention. In various embodiments, the base stations 101 and 160, while operating over two different frequencies, may be providing coverage for a common sector, or a common cell site, or two sectors of a common cell site, or one sector of a cell site and one sector of another cell site, or one sector of a cell site and an omni sector cell site.

Figure 3:
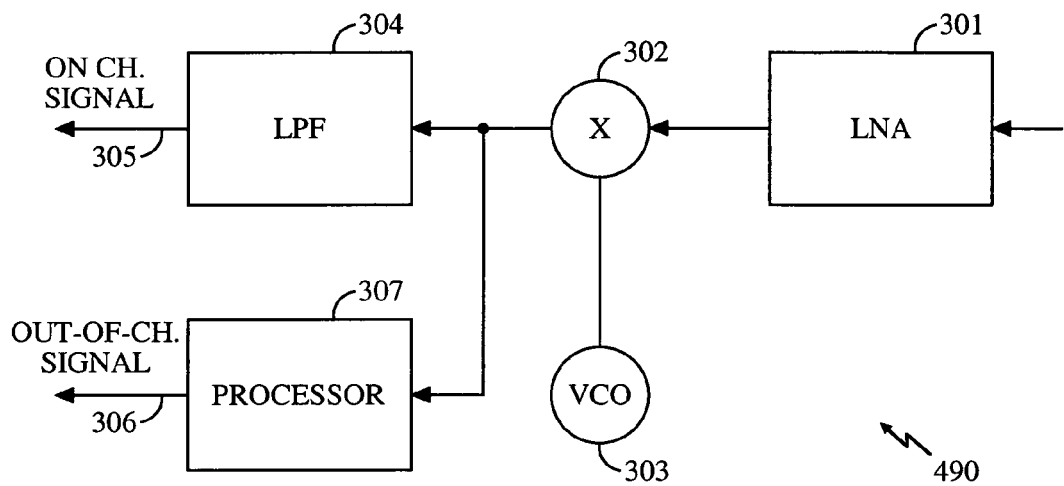
FIG. 3 illustrates a communication system receiver RF/IF system for down converting a received signal to base band frequencies in accordance with various embodiments of the invention.

Referring to FIG. 3, the RF/IF system 490 produces the on-channel and out-of-channel received samples in accordance with various embodiments of the invention. RF/IF system 490 may include a low noise amplifier 301 for amplifying the received signal from antenna 492 in accordance with various embodiments of the invention. The received signal is passed to a down converter 302. A frequency source 303, such as a voltage-controlled oscillator, may provide a signal at the on-channel carrier frequency for down converting the on-channel signal to the base band frequency. The resulting signal is passed through a low pass filter 304 for filtering the out-of-channel signals and producing an on-channel received samples 305. The down converted signal is also passed through a processor 307. Processor 307 isolates, for searching pilots of the candidate frequencies, the out-of channel received samples 306. Processor 307 performs the operation in accordance with a commonly known Digital Signal Processing (DSP) or any other commonly known methods. A DSP processor allows isolating a specific portion of a frequency band by digitally filtering other portions. The isolated frequency band may be digitally shifted to the base band frequency as the out-of-channel received samples 306. Receiver 400 in accordance with an embodiment includes a number of fingers 408. The on-channel and out-of-channel samples 305 and 306 are supplied to the searcher unit 406 and finger elements 408. While the finger elements 408 are processing the on-channel samples for demodulation and the decoding operation in decoder 414, the searcher unit 406 and possibly in combination with at least one of the fingers 408 may determine the quality of the out-of channel samples. The quality measure may be limited to measuring the signal strength and signal-to-noise ratio or other parameters of the out-of-channel received samples. If the quality measurement satisfies a threshold, the base station that originated the signal may be a possible candidate for hard handoff operation with the mobile station. The control system 410 may control passing the on-channel and out-of channel samples 305, 306 to respective fingers 408 and searcher 406 by controlling demux 402. The processing of the out-of channel samples may be limited to the processing of the pilot channel information transmitted from the candidate base stations. Therefore, the on-channel and out-of-channel received samples may be processed at the same time in accordance with various embodiments of the invention.

Figure 4:
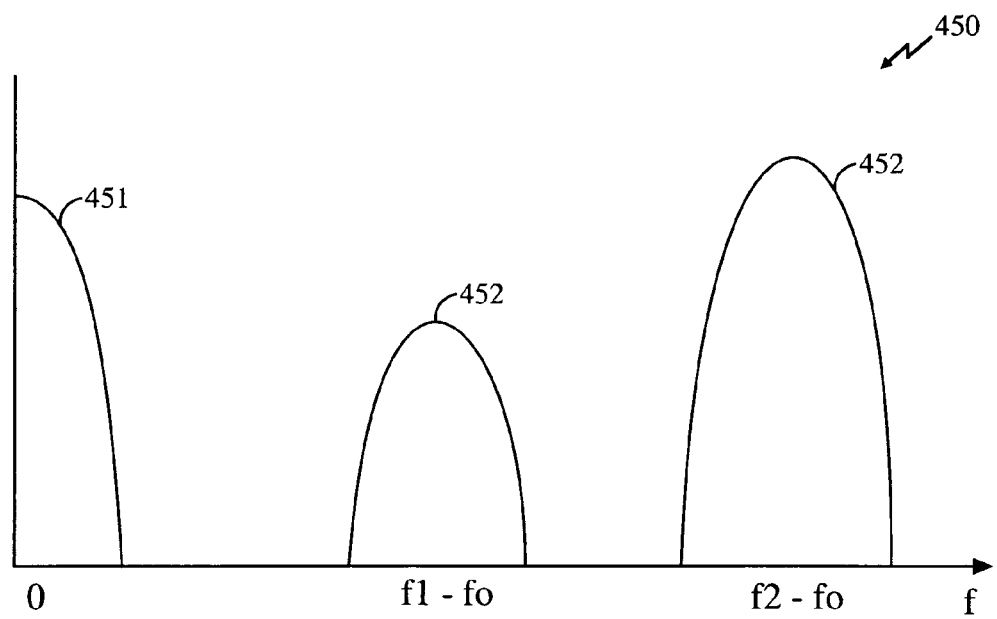
FIG. 4 illustrates a graph of the down converted received signal frequencies presented to a back-end base band processing unit in accordance with various aspects of the invention.

Referring to FIG. 4, a graphical representation of the on-channel and out of channel frequency spectrum 450 at the output of down converter 302 is shown. The input signal of down converter 302 may contain pilot signals at different frequencies from different base stations and GPS originated signal as well as the traffic channel signals. The received signal may be mathematically represented as:

$$r(t) = \sum_{i=1}^{N} a_i(t)\cos(w_i t) + n(t) \quad (1)$$

The frequency spectrum 450 of the output signal of the down converter 302 may be represented by the following:

$$r_d(t) = \sum_{i=1}^{N} a_i(t)[\cos((w_i - w_o)t) + \cos((w_i + w_o)t)] + n(t) \quad (2)$$

The low pass filter 304 filters the high frequency components 452 shown in graph 450. The low-pass filtered version 451 of the signal may have the representation as following:

$$r_f(t) = \sum_{i=1}^{N} a_i(t)\cos((w_i - w_o)t) + n(t) \quad (3)$$

The filtered version 451 of the received signal may be represented as the on-channel received samples. The processor 307 may be using digital band pass filtering and is able to separate the out-of channel desired candidate frequencies and GPS originated signals from the high frequency components 452. The high frequency components contain the out-of channel signals for searching pilots on the candidate frequencies as well as the GPS signal components in accordance with an embodiment. As such, the receiver 400 while incorporating various aspects of the RF/IF system 490 as shown in and described in relation to FIG. 3 is able to process and maintain a traffic channel communication while the receiver is examining different candidate frequencies and receive GPS originated signals. Various embodiments of the invention, thus, provide an efficient receiver and an accompanying method for providing uninterrupted communication services in a communication system while the receiver is searching for hard handoff candidate frequencies and/or receiving GPS originated signal. Such a receiver may be used to search GPS frequency band while in two-way communication with cellular or PCS systems. The results of the search may be used to determine the location of the wireless device without interrupting the ongoing communication channel.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A communication receiver, comprising:
a low pass filter that filters a base band signal to produce on-channel received samples by removing out-of-channel signals from the baseband signal;
a processor that processes said base band signal to produce out-of-channel received samples based on the out-of-channel signals, the out-of-channel received samples including pilot information; and,
a searcher that is configured to search for hard handoff candidate frequencies using the pilot information,
wherein said out-of-channel signals are outside a frequency bandwidth associated with said base band signal.

2. The receiver as recited in claim 1, further comprising:
a receiver back-end portion that:
processes said on-channel and out-of-channel received samples essentially at the same time to decode said on-channel received samples, and
determines at least one of a link quality and global positioning system originated information of said out-of-channel received samples.

3. The receiver as recited in claim 2, wherein said receiver back-end portion includes:
a number of fingers and a searcher for processing said on-channel and said out-of-channel received samples.

4. The receiver as recited in claim 1, further comprising:
a frequency source that generates a first signal at essentially the same frequency as an on-channel frequency; and
a multiplier that mixes an amplified, received signal and the first signal to produce the base band signal.

5. The receiver as recited in claim 1, further comprising:
a low noise amplifier that amplifies a received signal comprising an on-channel signal and the out-of-channel signals.

6. A communications receiver, comprising:
means for receiving a first signal comprising an on-channel signal and out-of-channel signals;
means for mixing the first signal with a second signal at essentially the same frequency as an on-channel frequency to produce a base band signal;
means for filtering said base band signal to produce on-channel received samples by removing out-of-channel signals from the baseband signal;
means for processing said base band signal to produce out-of-channel received samples based on said out-of-channel signals, the out-of-channel received samples including pilot information; and
means for searching for hard handoff candidate frequencies using the pilot information,
wherein said out-of-channel signals are outside a frequency bandwidth associated with said base band signal.

7. A communication receiver, comprising:
a low noise amplifier that amplifies a received signal comprising an on-channel signal and out-of-channel signals;
a frequency source that generates a first signal at essentially the same frequency as an on-channel frequency;
a multiplier that mixes the amplified, received signal and the first signal to produce a base band signal;
a low pass filter that filters said base band signal to produce on-channel received samples by removing out-of-channel signals from the baseband signal;
a processor that processes said base band signal to produce out-of-channel received samples based on the out-of-channel signals, the out-of-channel received samples including pilot information; and
a searcher that is configured to search for hard handoff candidate frequencies using the pilot information.

8. A communication method, comprising:
receiving a first signal comprising an on-channel signal and out-of-channel signals;
mixing the first signal with a second signal at essentially the same frequency as an on-channel frequency to produce a base band signal;
filtering said base band signal to produce on-channel received samples by removing out-of-channel signals from the base band signal;

processing said base band signal to produce out-of channel received samples based on the out-of-channel signals, the out-of-channel received samples including pilot information; and searching for hard handoff candidate frequencies using the pilot information.

9. A communication receiver, comprising:

means for filtering a base band signal to produce on-channel received samples by removing out-of-channel signals from the base band signal;

means for processing said base band signal to produce out-of-channel received samples based on the out-of-channel signals, the out-of-channel received samples including pilot information; and means for searching for hard handoff candidate frequencies using the pilot information.

10. The receiver as recited in claim 9, further comprising:

means for processing the on-channel and the out-of-channel received samples essentially at the same time to decode said on-channel received samples, and means for determining that at least one of a link quality and global positioning system originated information of said out-of-channel received samples.

11. The receiver as recited in claim 10, wherein the means for processing comprises:

a plurality of fingers; and a searcher for processing said on-channel and out-of-channel received samples.

12. The receiver as recited in claim 9, further comprising:

means for generating a first signal at essentially the same frequency as an on-channel frequency; and means for mixing the received signal and the first signal to produce a base band signal.

13. The receiver as recited in claim 9, further comprising:

means for amplifying a received signal comprising an on-channel signal and the out-of-channel signals.

14. A method, comprising:

amplifying a received signal comprising an on-channel signal and out-of-channel signals;

generating a first signal at essentially the same frequency as an on-channel frequency;

mixing the amplified, received signal and the first signal to produce a base band signal;

filtering the base band signal to produce on-channel received samples by removing out-of-channel signals from the baseband signal;

processing said base band signal to produce out-of-channel received samples based on said out-of-channel signals, the out-of-channel received samples including pilot information; and searching for hard handoff candidate frequencies using the pilot information, wherein said out-of-channel signals are outside a frequency bandwidth associated with said base band signal.

15. The method as recited in claim 14, further comprising:

wherein filtering and processing takes place at essentially at the same time.

16. The method as recited in claim 14, further comprising:

determining at least one of a link quality and global positioning system originated information based on said out-of-channel received samples.

\* \* \* \* \*